US012752595B2

(12) United States Patent
Suzuki

(10) Patent No.: US 12,752,595 B2
(45) Date of Patent: Oct. 6, 2026

(54) THERMAL MANAGEMENT SYSTEM

(71) Applicant: TOYOTA JIDOSHA KABUSHIKI KAISHA, Toyota (JP)

(72) Inventor: Tomoaki Suzuki, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 25 days.

(21) Appl. No.: 18/416,044

(22) Filed: Jan. 18, 2024

(65) Prior Publication Data

US 2024/0300289 A1 Sep. 12, 2024

(30) Foreign Application Priority Data

Mar. 9, 2023 (JP) ................................ 2023-036629

(51) Int. Cl.
*B60H 1/00* (2006.01)
*B60H 1/02* (2006.01)

(52) U.S. Cl.
CPC ..... *B60H 1/00878* (2013.01); *B60H 1/00278* (2013.01); *B60H 1/02* (2013.01); *B60H 2001/00928* (2013.01); *B60H 2001/00961* (2019.05)

(58) Field of Classification Search
CPC .. B60H 1/00878; B60H 1/00278; B60H 1/02; B60H 2001/00961; B60H 2001/00928
USPC ......................................................... 165/202
See application file for complete search history.

(56) References Cited

U.S. PATENT DOCUMENTS

2021/0291628 A1 9/2021 Kinoshita et al.
2021/0301691 A1 9/2021 Hasegawa et al.
2021/0309075 A1 10/2021 Hasegawa et al.

FOREIGN PATENT DOCUMENTS

DE 112014001830 T5 * 12/2015
DE 112014002714 T5 * 3/2016
DE 112014006077 T5 * 9/2016 ............... B60H 1/24
JP 2019-047555 A 3/2019
JP 2021-146944 A 9/2021
JP 2021-154767 A 10/2021
JP 2021-164332 A 10/2021
JP 2022-060754 A 4/2022

* cited by examiner

*Primary Examiner* — Len Tran
(74) *Attorney, Agent, or Firm* — SoraIP, Inc.

(57) ABSTRACT

The thermal management system includes a power storage device provided in a first flow path, a drive device provided in a second flow path, a radiator provided in a third flow path, a chiller provided in a fourth flow path, and a switching device. The switching device separates the first flow path from the other flow paths when the temperature of the power storage device is higher than or equal to the first set temperature and lower than or equal to the second set temperature.

8 Claims, 7 Drawing Sheets

THERMAL MANAGEMENT SYSTEM

CROSS-REFERENCE TO RELATED APPLICATION

This application claims priority to Japanese Patent Application No. 2023-036629 filed on Mar. 9, 2023 incorporated herein by reference in its entirety.

BACKGROUND

1. Technical Field

The present disclosure relates to a thermal management system.

2. Description of Related Art

For example, Japanese Unexamined Patent Application Publication No. 2021-154767 (JP 2021-154767 A) discloses a thermal management system mounted on a battery electric vehicle. The thermal management system includes a power storage device (battery), a power control unit (PCU), and the like.

SUMMARY

As described in JP 2021-154767 A, it is desirable in the thermal management system to appropriately manage the temperature of the power storage device.

An object of the present disclosure is to provide a thermal management system that can appropriately manage the temperature of a power storage device.

A thermal management system according to one aspect of the present disclosure is provided in an electric device. The thermal management system includes:

- a first flow path, a second flow path, a third flow path, and a fourth flow path each configured to allow a heat medium to flow through the flow path;
- a power storage device configured to exchange heat with the first flow path;
- a drive device configured to exchange heat with the second flow path and supply a driving force to the electric device;
- a radiator provided in the third flow path;
- a chiller provided in the fourth flow path;
- a switching device configured to switch a connection state between the first flow path, the second flow path, the third flow path, and the fourth flow path; and
- a control device configured to control the switching device.

The control device is configured to control the switching device into a disconnection mode in which the first flow path is disconnected from the other flow paths when the temperature of the power storage device is equal to or higher than a first set temperature and equal to or lower than a second set temperature that is higher than the first set temperature.

The first set temperature and the second set temperature are set within a range in which the power storage device can fully exert its performance. Each set temperature may be updated by machine learning based on the outside air temperature or the like.

A thermal management system according to another aspect of the present disclosure is provided in an electric device. The thermal management system includes:

- a first flow path, a second flow path, a third flow path, and a fourth flow path each configured to allow a heat medium to flow through the flow path;
- a power storage device configured to exchange heat with the first flow path;
- a drive device configured to exchange heat with the second flow path and supply a driving force to the electric device;
- a radiator provided in the third flow path;
- a chiller provided in the fourth flow path; and
- a switching device configured to switch a connection state between the first flow path, the second flow path, the third flow path, and the fourth flow path.

The switching device is configured to switch a heat storage mode and a defrosting mode.

The heat storage mode is a mode in which a circuit where the first flow path is disconnected from the other flow paths and the heat medium circulates through only the second flow path is provided and a circuit where the heat medium circulates through the third flow path and the fourth flow path is provided.

The defrosting mode is a mode in which a circuit where the first flow path is disconnected from the other flow paths and the heat medium circulates at least through the second flow path and the third flow path is provided.

According to the present disclosure, it is possible to provide the thermal management system that can appropriately manage the temperature of the power storage device.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
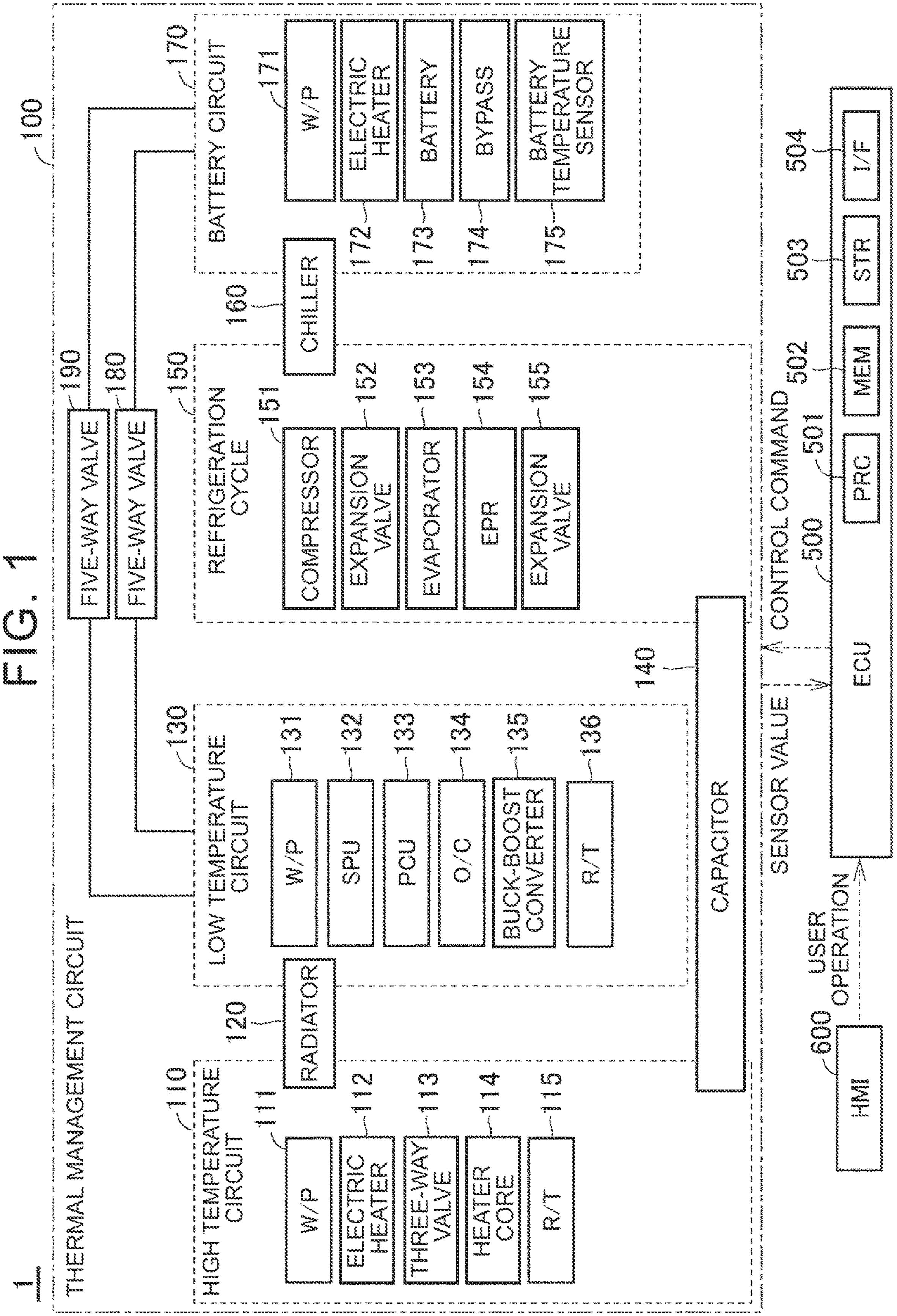
FIG. 1 is a diagram showing the configuration of a thermal management system in a first embodiment of the present disclosure.

Hereinafter, a first embodiment of the present disclosure will be described in detail with reference to the drawings. In the drawings, the same or corresponding parts are given the same reference numerals, and the description thereof will not be repeated.

Below, a configuration in which a thermal management system according to the present disclosure is mounted on an electrified vehicle (not shown) will be described as an example. The electrified vehicle is preferably a vehicle equipped with a battery 173 for driving, such as a battery electric vehicle (BEV). The electrified vehicle may be a hybrid electric vehicle (HEV), a plug-in hybrid electric vehicle (PHEV), or a fuel cell electric vehicle (FCEV). However, the application of the thermal management system according to the present disclosure is not limited to vehicles. Note that the electrified vehicle is an example of an "electrical device" in the present disclosure.

First Embodiment

Overall Structure

FIG. 1 shows an example of the overall configuration of a thermal management system 1 according to a first embodiment of the present disclosure. The thermal management system 1 includes a thermal management circuit 100, an electronic control unit (ECU) 500, and a human machine interface (HMI) 600. Note that ECU 500 is an example of a "control device" of the present disclosure.

The thermal management circuit 100 is configured so that a medium (such as water) that transfers heat flows therethrough. As shown in FIG. 1, the thermal management circuit 100 includes, for example, a high temperature circuit 110, a radiator 120, a low temperature circuit 130, a condenser 140, a refrigeration cycle 150, a chiller 160, a battery circuit 170, and a five-way circuit. It includes a valve 180 and a five-way valve 190. Note that each of the five-way valve 180 and the five-way valve 190 is an example of a "switching device" of the present disclosure.

The high temperature circuit 110 includes, for example, a water pump (W/P) 111, an electric heater 112, a three-way valve 113, a heater core 114, a reservoir tank (R/T) 115, and a heat medium (not shown) (such as water). including.

Radiator 120 is connected to (i.e., shared with) both high temperature circuit 110 and low temperature circuit 130. Radiator 120 includes a High Temperature (HT) radiator 121 (see FIG. 2) and a Low Temperature (LT) radiator 122 (see FIG. 2). Note that the low-temperature radiator 122 is an example of a "radiator" in the present disclosure.

The low temperature circuit 130 includes, for example, a water pump 131, a Smart Power Unit (SPU) 132, a Power Control Unit (PCU) 133, an oil cooler (O/C) 134, a buck-boost converter 135, and a reservoir tank 136, and a heat medium (such as water) not shown. Note that the PCU 133 and the oil cooler 134 are an example of a "drive device" in the present disclosure.

Condenser 140 is connected to both high temperature circuit 110 and refrigeration cycle 150.

The refrigeration cycle 150 includes, for example, a compressor 151, an expansion valve 152, an evaporator 153, an Evaporative Pressure Regulator (EPR) 154, an expansion valve 155, and a working medium (not shown) (such as water or a medium with a lower boiling point than water).

Chiller 160 is connected to both refrigeration cycle 150 and battery circuit 170.

Battery circuit 170 includes, for example, a water pump 171, an electric heater 172, a battery 173, a bypass flow path 174, a battery temperature sensor 175, and a heat medium temperature sensor 176. Note that the water pump 171 and the battery 173 are examples of a "pump" and a "power storage device" of the present disclosure, respectively.

Each of five-way valve 180 and five-way valve 190 is connected to low temperature circuit 130 and battery circuit 170. The configuration of thermal management circuit 100 is explained in detail in FIG. 2.

ECU 500 controls thermal management circuit 100. ECU 500 includes a processor 501, memory 502, storage 503, and interface 504.

Processor 501 is, for example, a Central Processing Unit (CPU) or a Micro-Processing Unit (MPU). Memory 502 is, for example, Random Access Memory (RAM). The storage 503 is a rewritable nonvolatile memory such as a hard disk drive (HDD), solid state drive (SSD), or flash memory. Storage 503 stores a system program including an Operating System (OS) and a control program including computer-readable codes necessary for control calculations. The processor 501 reads system programs and control programs, expands them into the memory 502, and executes them, thereby realizing various processes. Interface 504 controls communication between ECU 500 and components of thermal management circuit 100.

ECU 500 generates control commands based on sensor values obtained from various sensors included in thermal management circuit 100 (for example, battery temperature sensor 175), user operations received by HMI 600, and the like. ECU 500 outputs the generated control command to thermal management circuit 100. ECU 500 may be divided into multiple ECUs for each function. Further, although FIG. 1 shows an example in which the ECU 500 includes one processor 501, the ECU 500 may include a plurality of processors. The same applies to the memory 502 and storage 503.

In this specification, a "processor" is not limited to a narrowly defined processor that executes processing using a stored program method. A "processor" may include hardwired circuits such as Application Specific Integrated Circuits (ASICs), Field-Programmable Gate Arrays (FPGAs), and the like. Therefore, the term "processor" can also be read as processing circuitry, in which processing is predefined by computer readable code and/or hardwired circuitry.

The HMI 600 is a display with a touch panel, an operation panel, a console, etc. HMI 600 accepts user operations for controlling thermal management system 1. HMI 600 outputs a signal indicating a user operation to ECU 500.

Thermal Management Circuit Configuration

Figure 2:
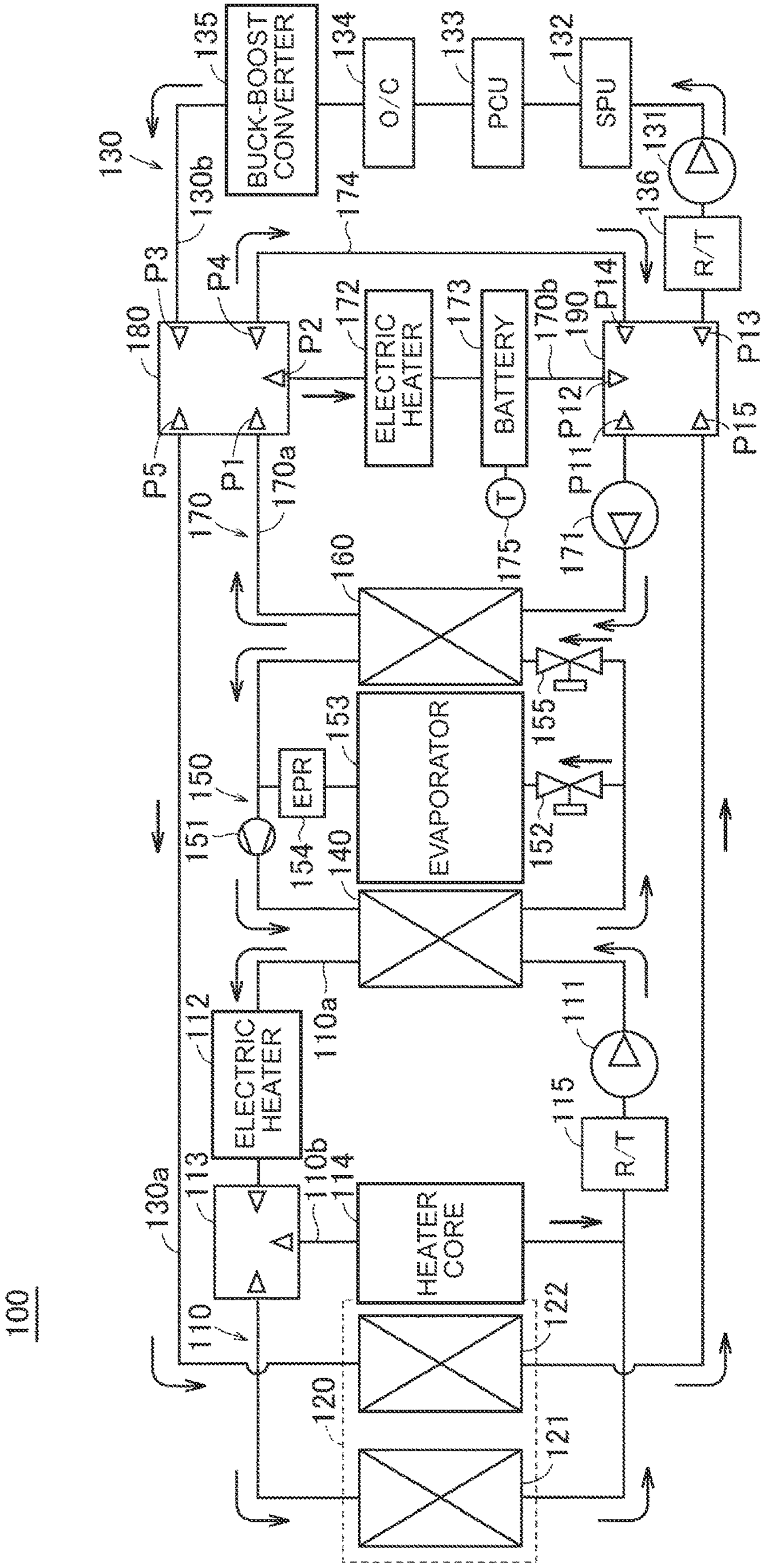
FIG. 2 is a diagram showing the configuration of a thermal management circuit in the thermal management system.
Figure 3:
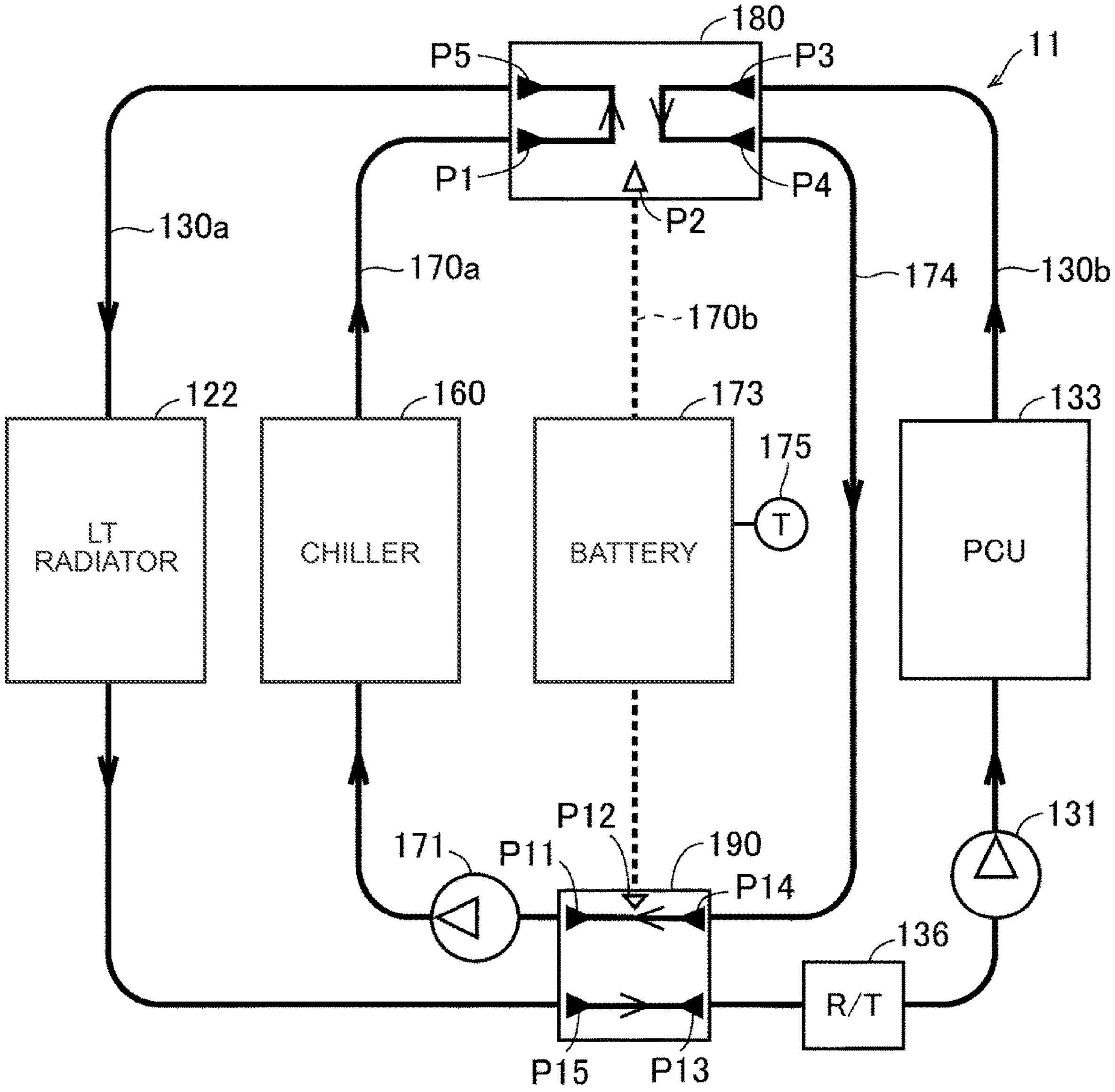
FIG. 3 is a diagram schematically illustrating an example of a disconnection mode of the thermal management circuit.

FIG. 2 shows an example of the configuration of the thermal management circuit 100 in the first embodiment. As shown in FIG. 3, the high temperature circuit 110 has a flow path 110*a* and a flow path 110*b*. The flow path 110*a* connects the water pump 111, the condenser 140, the electric heater 112, the three-way valve 113, the high temperature radiator 121, the reservoir tank 115, and the water pump 111 in this order. The flow path 110*b* connects the three-way valve 113, the heater core 114, and the reservoir tank 115 in this order.

The heat medium (for example, water) in the high-temperature circuit 110 is passed through a first path that circulates in this order: water pump 111—condenser 140—electric heater 112—three-way valve 113—heater core 114—reservoir tank 115—water pump 111, and the water pump. The water flows through at least one of the second paths that circulate through 111—condenser 140—electric heater 112—three-way valve 113—high temperature radiator 121—reservoir tank 115—water pump 111 in this order. The three-way valve 113 switches the flow path of the heat medium so that the heat medium flows through at least one of the first path and the second path.

Water pump 111 circulates a heat medium within high temperature circuit 110 according to control commands from ECU 500. Condenser 140 exchanges heat between the heat medium and the working medium in refrigeration cycle 150. Electric heater 112 heats the heat medium. The heater core 114 heats air supplied to a vehicle cabin (not shown) of the electrified vehicle using a heat medium. The reservoir tank 115 maintains the pressure and amount of the heat medium in the high temperature circuit 110 by storing a portion of the heat medium in the high temperature circuit 110.

As shown in FIGS. 2 and 3, the low temperature circuit 130 includes a flow path 130*a* and a flow path 130*b*. The flow path 130*a* connects the five-way valve 180, the low-temperature radiator 122, and the five-way valve 190 in this order. The flow path 130*b* connects the five-way valve 190, the reservoir tank 136, the water pump 131, the SPU 132, the PCU 133, the oil cooler 134, the step-up/down converter 135, and the five-way valve 180 in this order. The flow path 130*b* is in thermal contact with the SPU 132, the PCU 133, the oil cooler 134, and the step-up/down converter 135. Note that the flow path 130*a* is an example of the "third flow path" of the present disclosure, and the flow path 130*b* is an example of the "second flow path" of the present disclosure.

The heat medium (for example, water) in the low temperature circuit 130 includes a water pump 131—SPU 132—PCU 133—oil cooler 134—buck-boost converter 135—five-way valve 180—low-temperature radiator 122—five-way valve 190—reservoir tank 136—water It flows through the path that circulates through the pump 131 in this order.

Water pump 131 circulates a heat medium within low temperature circuit 130 according to control instructions from ECU 500. SPU 132 controls charging and discharging of battery 173 according to control commands from ECU 500. PCU 133 converts DC power supplied from battery 173 into AC power according to control instructions from ECU 500. PCU 133 supplies the AC power to a motor (not shown) built into the transaxle. The oil cooler 134 circulates lubricating oil for the motor using an Electrical Oil Pump (EOP) (not shown). The oil cooler 134 cools the transaxle by heat exchange between the heat medium circulating in the low temperature circuit 130 and the lubricating oil of the motor. The SPU 132, PCU 133, oil cooler 134, and step-up/down converter 135 are cooled by the heat medium circulating in the low-temperature circuit 130. The reservoir tank 136 maintains the pressure and amount of the heat medium in the low temperature circuit 130 by storing a portion of the heat medium in the low temperature circuit 130. Each of five-way valve 180 and five-way valve 190 switches the path of the heat medium in low temperature circuit 130 and battery circuit 170 in accordance with control commands from ECU 500. The low temperature radiator 122 is placed near the high temperature radiator 121. The heat medium flowing in the low temperature radiator 122 exchanges heat with the heat medium flowing in the high temperature radiator 121. Note that the above transaxle may be provided in the low temperature circuit 130 instead of the oil cooler 134.

The working medium in the refrigeration cycle 150 is passed through at least a first path that circulates through compressor 151—condenser 140—expansion valve 152—evaporator 153—EPR 154—compressor 151 in this order, and a second path the circulates through compressor 151—condenser 140—expansion valve 155—chiller 160—compressor 151 in this order. The expansion valve 152 and the expansion valve 155 switch the flow path of the working medium so that the working medium flows through at least one of the first path and the second path.

The compressor 151 compresses the gas phase working medium flowing out from the chiller 160. The condenser 140 condenses the working medium by exchanging heat between the gaseous working medium discharged from the compressor 151 and the heat medium flowing through the high temperature circuit 110. Expansion valve 152 and expansion valve 155 expand the working medium flowing out from condenser 140. The evaporator 153 evaporates the working medium by exchanging heat between the working medium flowing out from the expansion valve 152 and the air supplied to the vehicle cabin of the electrified vehicle. The evaporation pressure regulating valve 154 regulates the pressure of the working medium flowing out from the evaporator 153.

As shown in FIGS. 2 and 3, the battery circuit 170 has a flow path 170*a* and a flow path 170*b*. The flow path 170*a* connects the five-way valve 190, the water pump 171, the chiller 160, and the five-way valve 180 in this order. The flow path 170*b* connects the five-way valve 180, the electric heater 172, the battery 173, and the five-way valve 190 in this order. Flow path 170*b* is in thermal contact with battery 173. Note that the flow path 170*a* is an example of the "fourth flow path" of the present disclosure, and the flow path 170*b* is an example of the "first flow path" of the present disclosure.

The heat medium in the battery circuit 170 (the same heat medium as the heat medium flowing through the low temperature circuit 130) is connected to the water pump 171—chiller 160—five-way valve 180—electric heater 172—battery 173—five-way valve 190—water pump 171. The water flows through at least one of the first path, which circulates in this order, and the second path, which circulates in this order: water pump 171—chiller 160—five-way valve 180—bypass flow path 174—five-way valve 190—water pump 171. The five-way valve 180 and the five-way valve 190 switch between the first route and the second route so that the heat medium flows through at least one of the first route and the second route.

Water pump 171 circulates a heat medium within battery circuit 170 according to control commands from ECU 500. Chiller 160 cools the heat medium circulating in battery circuit 170 by exchanging heat between the working medium circulating in refrigeration cycle 150 and the heat medium circulating in battery circuit 170. Electric heater 172 heats the heat medium according to control instructions from ECU 500. The battery 173 supplies power for running to a motor built into the transaxle. Battery 173 may be heated using electric heater 172 or cooled using chiller 160. Bypass flow path 174 connects five-way valve 180 and five-way valve 190 so that the heat medium bypasses electric heater 172 and battery 173. When the heat medium flows through the bypass flow path 174, changes in the temperature of the heat medium due to heat absorption/radiation between the heat medium and the battery 173 are suppressed. Battery temperature sensor 175 detects the temperature of battery 173.

The five-way valve 180 is provided with five ports P1 to P5. Port P1 is an inlet port into which the heat medium flows from chiller 160. Port P2 is an exit port, and the heat medium flows out toward the electric heater 172 and battery 173 of the battery circuit 170 at the exit port. Port P3 is an inlet port, into which the heat medium that has passed through the SPU 132, PCU 133, oil cooler 134, and step-up/down converter 135 of the low-temperature circuit 130 flows. Port P4 is an exit port, and the heat medium flows out toward the bypass flow path 174 of the battery circuit 170 at the exit port. Port P5 is an outlet port through which the heat medium flows out toward low temperature radiator 122.

The five-way valve 190 is provided with five ports P11 to P15. Port P11 is an exit port through which the heat medium flows out toward chiller 160. The port P12 is an inlet port, into which the heat medium that has passed through the electric heater 172 and battery 173 of the battery circuit 170 flows. Port P13 is an exit port, and the heat medium flows out toward SPU 132, PCU 133, oil cooler 134, and step-up/down converter 135 of low-temperature circuit 130 at the exit port. Port P14 is an inlet port into which the heat medium flows from the bypass flow path 174 of the battery circuit 170. Port P15 is an inlet port into which the heat medium flows from the low temperature radiator 122.

Mode

FIG. 3 is a conceptual diagram showing an overview of a predetermined mode (hereinafter sometimes referred to as disconnection mode) in the thermal management circuit 100. The thermal management circuit 100 is formed by controlling a five-way valve 180 and a five-way valve 190. By controlling the five-way valve 180 and the five-way valve 190, the connection state of each flow path 130*a*, 130*b*, 170*a*, 170*b* and the bypass flow path 174 is switched. Thereby, the thermal management circuit 100 is switched to a plurality of modes including a disconnection mode.

Here, the battery 173 has a temperature range in which its capabilities are effectively exhibited. Therefore, when the temperature of the battery 173 is within the temperature range, it is preferable that unnecessary heat does not flow into the battery 173 and that the battery 173 is not unnecessarily cooled. Hereinafter, the lower limit of the temperature range will be referred to as a first set temperature T1. The upper limit of the temperature range is expressed as a second set temperature T2. Note that the first set temperature T1 and the second set temperature T2 may be updated by machine learning based on the outside temperature or the like.

In this embodiment, when the temperature of the battery 173 (detected value of the battery temperature sensor 175) is higher than or equal to the first set temperature T1 and lower than the second set temperature T2, the ECU 500 controls the five-way valve 180 and the five-way valve 190 to enter the disconnection mode shown in FIG. 3. In the disconnection mode, the battery 173 is disconnected from other channels. For example, in the disconnection mode shown in FIG. 3, the five-way valve 180 forms a path that communicates port P1 and port P5, and a path that communicates port P3 and port P4, and the five-way valve 190 forms a path that communicates between ports P11 and P14 and a path that communicates between ports P13 and P15.

As a result, a closed circuit 11 is formed. In the closed circuit 11, a flow path 170*b* corresponding to a "first flow path" is separated from other flow paths, and a flow path 130*b* corresponding to a "second flow path", a bypass flow path 174, a flow path 170*a* corresponding to the "fourth flow path", and a flow path 130*a* corresponding to the "third flow path" are connected in this order. That is, the battery 173 is in a state separated from other circuits (independent state).

In the disconnection mode shown in FIG. 3, flow path 130*b* is disconnected from other channels. Therefore, unnecessary heat flow into the battery 173 and unnecessary cooling of the battery 173 are suppressed.

Although not shown, in the disconnection mode, the five-way valve 180 forms a path that communicates ports P1 and P4 and a path that communicates ports P3 and P5, and the five-way valve 190 Accordingly, a route that communicates between port P11 and port P15 and a route that communicates between port P13 and port P14 may be formed.

Alternatively, in the disconnection mode, the five-way valve 180 may form a path that communicates ports P1 and P5 and the path that communicates ports P3 and P4, and the five-way valve 190 may form a path that communicates ports P11 and P15, and a path that communicates ports P13 and P14. As a result, a closed circuit in which the flow path 170*b* corresponding to the "first flow path" is separated from the other flow paths, and the flow path 130*b* corresponding to the "second flow path" and the bypass flow path 174 are connected, A closed circuit is formed in which the flow path 170*a* corresponding to the "fourth flow path" and the flow path 130*a* corresponding to the "third flow path" are connected.

Alternatively, in the disconnection mode, the five-way valve 180 may form a path that communicates port P1 and port P4, and the path that communicates port P3 and port P5, and the five-way valve 190 may form a path that communicates port P11 and port P14, and a path that communicates port P13 and port P15. As a result, the flow path 170*b* corresponding to the "first channel" is separated from the other channels, and the flow path 130*b* corresponding to the "second channel" and the flow path 130*a* corresponding to the "third channel" are separated. A closed circuit in which the flow path 170*a* corresponding to the "fourth flow path" and the bypass flow path 174 are connected are formed.

Second Embodiment

Figure 4A:
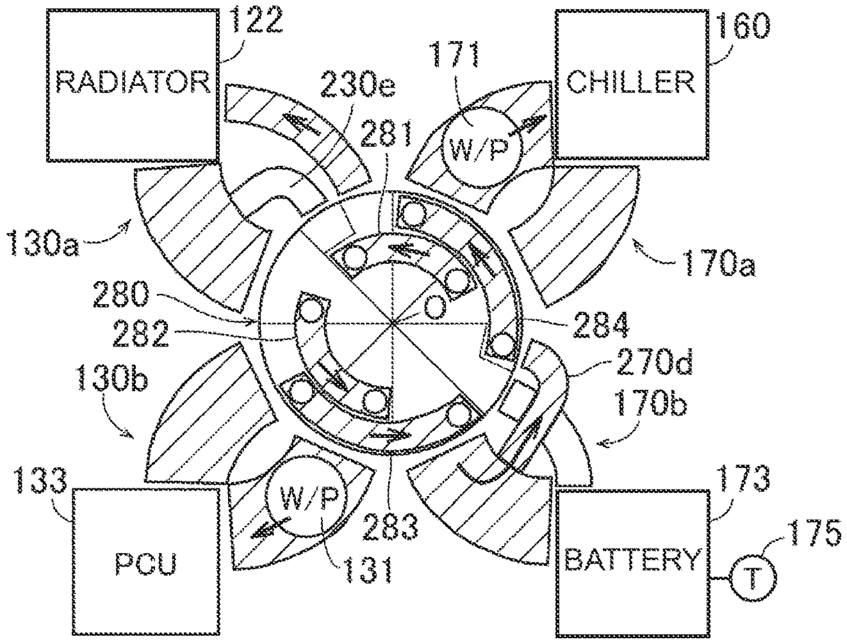
FIG. 4A is a diagram schematically illustrating an example of a disconnection mode of the thermal management circuit in the second embodiment of the present disclosure.
Figure 4B:
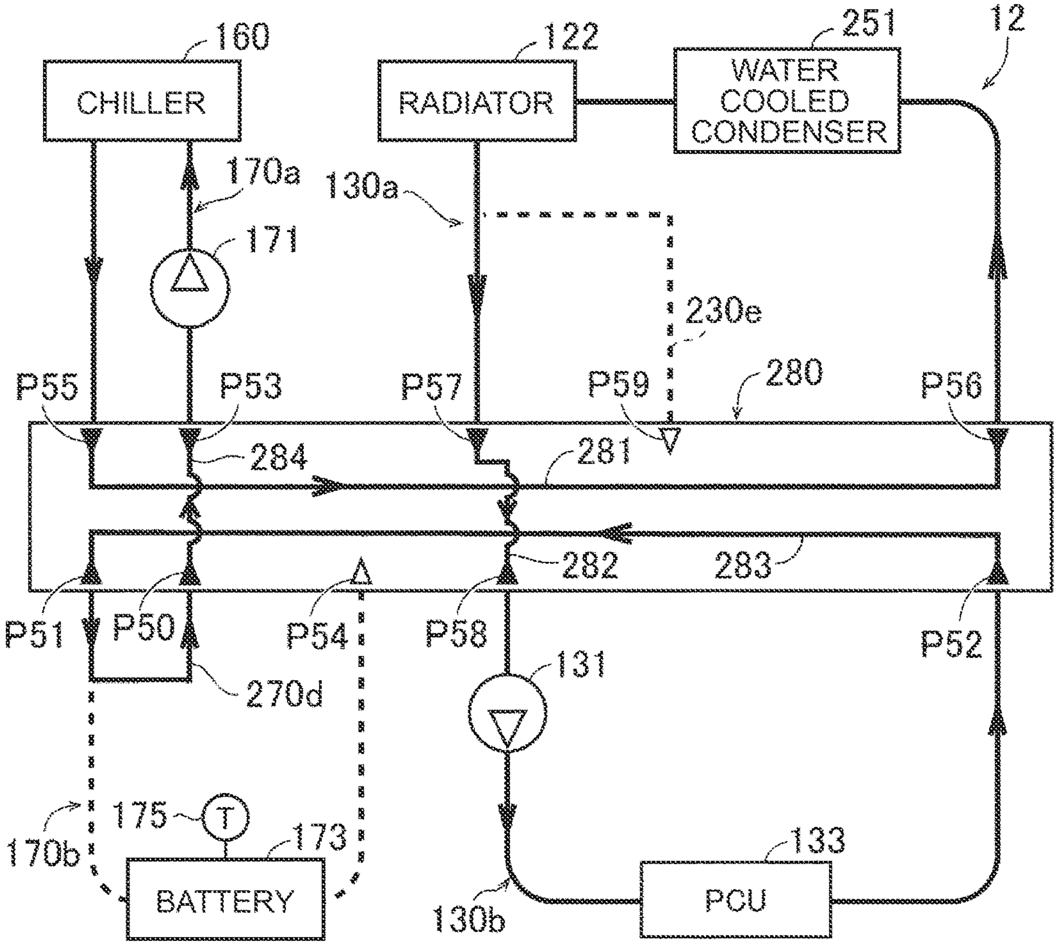
FIG. 4B is a diagram showing a schematic configuration of a thermal management circuit corresponding to FIG. 4A.

Next, a thermal management circuit in a second embodiment of the present disclosure will be described with reference to FIGS. 4A and 4B. FIG. 4A schematically illustrates an example of a disconnection mode of the thermal management circuit in a second embodiment of the present disclosure. FIG. 4B shows a schematic configuration of a thermal management circuit corresponding to FIG. 4A. Note that in the second embodiment, only the parts that are different from the first embodiment will be explained, and the same structure, operation, and effect as in the first embodiment will not be repeated.

The second embodiment differs from the thermal management circuit 100 (sec FIG. 2) according to the first embodiment in that it includes one ten-way valve 280 instead of the two five-way valves 180 and 190 as a switching device.

As shown in FIG. 4B, ten-way valve 280 includes ten ports P50 to P59. Flow path 170*b* is connected to port P51 and port P54. A bypass flow path 270*d* that bypasses the battery 173 is connected to the flow path 170*b*, and the bypass flow path 270*d* is connected to the port P50. Flow path 130*b* is connected to port P52 and port P58. Flow path 130*a* is connected to port P56 and port P57. A bypass flow path 230*e* that bypasses the low temperature radiator 122 is connected to the flow path 130*a*, and the bypass flow path 230*c* is connected to port P59. For example, a water-cooled condenser 251 (see FIG. 4B) may be provided in the flow path 130*a*. Note that in FIG. 4A, illustration of the water-cooled condenser 251 is omitted. Flow path 170*a* is connected to port P53 and port P55.

The ten-way valve 280 has a first internal flow path 281, a second internal flow path 282, a third internal flow path 283, and a fourth internal flow path 284. Each internal channel 281 to 284 connects two of the ten ports P50 to P59 to each other. These internal channels 281 to 284 are rotatable about a rotation center O (see FIG. 4A) while maintaining mutual phase.

In the disconnection mode shown in FIGS. 4A and 4B, the first internal flow path 281 connects ports P55 and P56. The second internal flow path 282 connects port P56 and port P58. The third internal flow path 283 connects port P51 and port P52. The fourth internal flow path 284 connects port P50 and port P53. In this separation mode, the flow path 170*b* corresponding to the "first flow path" is separated from the other flow paths. The heat medium circulates through the closed circuit 12 (see FIG. 4B) in which the flow path 130*b*, the bypass flow path 270*d*, the flow path 170*a*, and the flow path 130*a* are connected in this order.

Although not shown, in the disconnection mode, the first internal flow path 281 may connect ports P53 and P57, the second internal flow path 282 may connects ports P51 and P52, the third internal flow path 283 may connect port P50 and port P58, and fourth internal flow path 284 may connect port P55 and port P59. In this case, the flow path 170*b* corresponding to the "first flow path" is separated from the other flow paths. A circuit in which the heat medium circulates through the flow path 130*b* and the bypass flow path 270*d*, and a circuit in which the heat medium circulates through the flow path 170*a* and the bypass flow path 230*e* are formed.

Alternatively, in the disconnection mode, the first internal flow path 281 may connect port P57 and port P58, the second internal flow path 282 may connect port P51 and port P55, the third internal flow path 283 may connect port P50 and port P53, and the fourth internal flow path 284 may connect the port P52 and the port P59. In this case, the flow path 170*b* corresponding to the "first flow path" is separated from the other flow paths. A circuit in which the heat medium circulates through the flow path 130*b* and the bypass flow path 230*e*, and a circuit in which the heat medium circulates through the flow path 170*a* and the bypass flow path 270*d* are formed.

Third Embodiment

Figure 5:
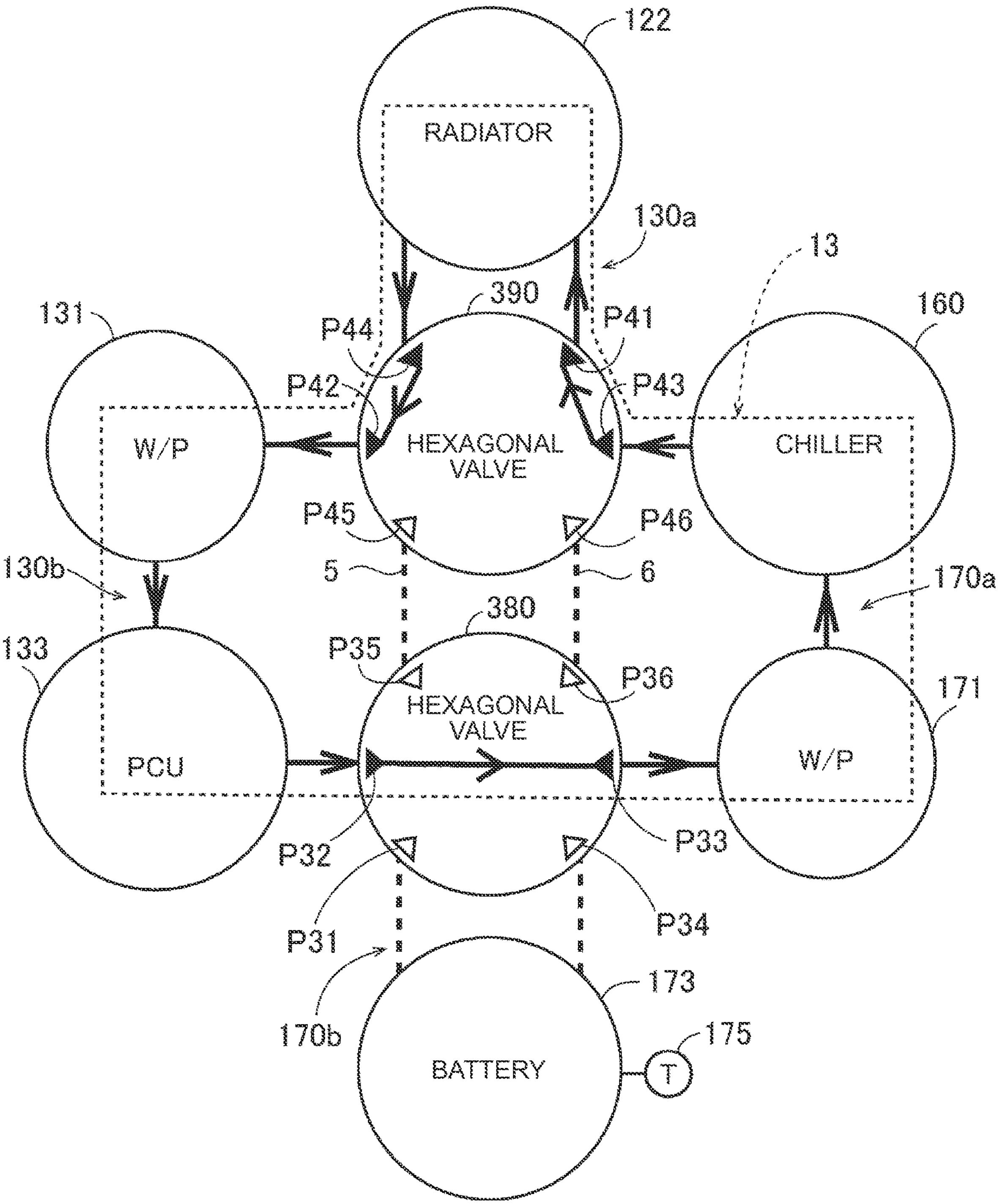
FIG. 5 is a diagram schematically illustrating an example of a disconnection mode of the thermal management system in the third embodiment of the present disclosure.

Next, a thermal management circuit in a third embodiment of the present disclosure will be described with reference to FIG. 5. FIG. 5 schematically illustrates an example of a decoupling mode of the thermal management system in a third embodiment of the present disclosure. Note that in the third embodiment, only the parts that are different from the first embodiment will be explained, and the same structure, operation, and effect as in the first embodiment will not be repeated.

The third embodiment differs from the thermal management circuit 100 (see FIG. 2) according to the first embodiment in that the switching device includes two six-way valves 380, 390 instead of the two five-way valves 180, 190.

As shown in FIG. 5, the six-way valve 380 includes six ports P31 to P36. The six-way valve 390 includes six ports P41 to P46. The six-way valve 380 is connected to a six-way valve 390. Specifically, port P35 of the six-way valve 380 and port P45 of the six-way valve 390 are connected by the connecting flow path 5, and port P36 of the six-way valve 380 and port P46 of the six-way valve 390 are connected by the connecting flow path 6. Note that the connecting flow path 5 and the connecting flow path 6 are an example of a "switching device" of the present disclosure.

Flow path 170*b* is connected to port P31 and port P34 of hexagonal valve 380. The flow path 130*b* is connected to port P32 of the six-way valve 380 and port P42 of the six-way valve 390. The flow path 130*a* is connected to ports P41 and P44 of the hexagonal valve 390. The flow path 170*a* is connected to port P33 of the six-way valve 380 and port P43 of the six-way valve 390.

In the disconnection mode shown in FIG. 5, ports P32 and P33 of the six-way valve 380 are connected to each other. Port P42 and port P44 of the six-way valve 390 are connected to each other. Port P41 and port P43 are connected to each other. In this separation mode, the flow path 170*b* corresponding to the "first flow path" is separated from the other flow paths. The heat medium circulates through the closed circuit 13 that connects the flow path 130*b*, the flow path 170*a*, and the flow path 130*a* in this order. Note that the closed circuit 13 can also be formed by changing the connection method of each port of each hexagonal valve 380, 390.

Although not shown, in the disconnection mode, ports P32 and P35 of the six-way valve 380 may be connected to each other, ports P33 and P36 may be connected to each other, ports P41 and P43 of the six-way valve 390 may be connected to each other, port P42 and port P45 may be connected to each other, and port P44 and port P46 may be connected to each other. In this disconnection mode, the flow path 170*b* corresponding to the "first flow path" is separated from the other flow paths, and a circuit in which the heat medium circulates between the flow path 130*b* and the switching device (six-way valves 380, 390), and a circuit in which the medium circulates between the flow path 170*a* and the flow path 130*a* are formed.

Alternatively, in the disconnection mode, ports P32 and P35 of the six-way valve 380 may be connected to each other, ports P33 and P36 may be connected to each other, ports P41 and P45 of the six-way valve 390 may be connected to each other, ports P42 and P45 may be connected to each other, and port P43 and port P46 may be connected to each other. In this disconnection mode, the flow path 170*b* corresponding to the "first flow path" is separated from the other flow paths, and a circuit in which the heat medium circulates between the flow path 130*b* and the flow path 130*a*, and a circuit in which the heat medium circulates between the flow path 170*a* and the switching device (six-way valves 380, 390) are formed.

Alternatively, in the disconnection mode, ports P32 and P35 of the six-way valve 380 are connected to each other, ports P33 and P36 are connected to each other, ports P42 and P45 of the six-way valve 390 are connected to each other, and ports P43 and P35 are connected to each other. Port P46 may be connected to each other. In this disconnection mode, the flow path 170*b* corresponding to the "first flow path" is separated from the other flow paths, and a circuit in which the heat medium circulates between the flow path 130*b* and the switching device (six-way valves 380, 390), A circuit is formed in which the medium circulates through the flow path 170*a* and the switching device (six-way valves 380, 390).

Fourth Embodiment

Figure 6A:
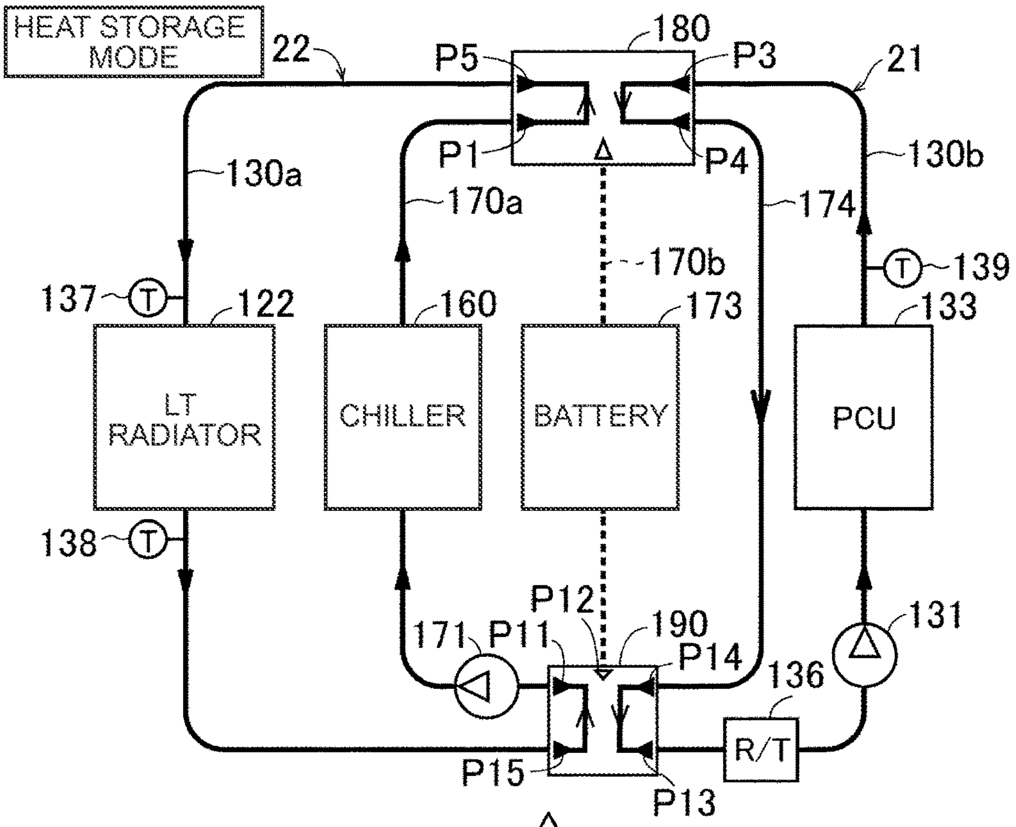
FIG. 6A is a diagram schematically showing an example of the heat storage mode of the thermal management circuit in the fourth embodiment of the present disclosure.
Figure 6B:
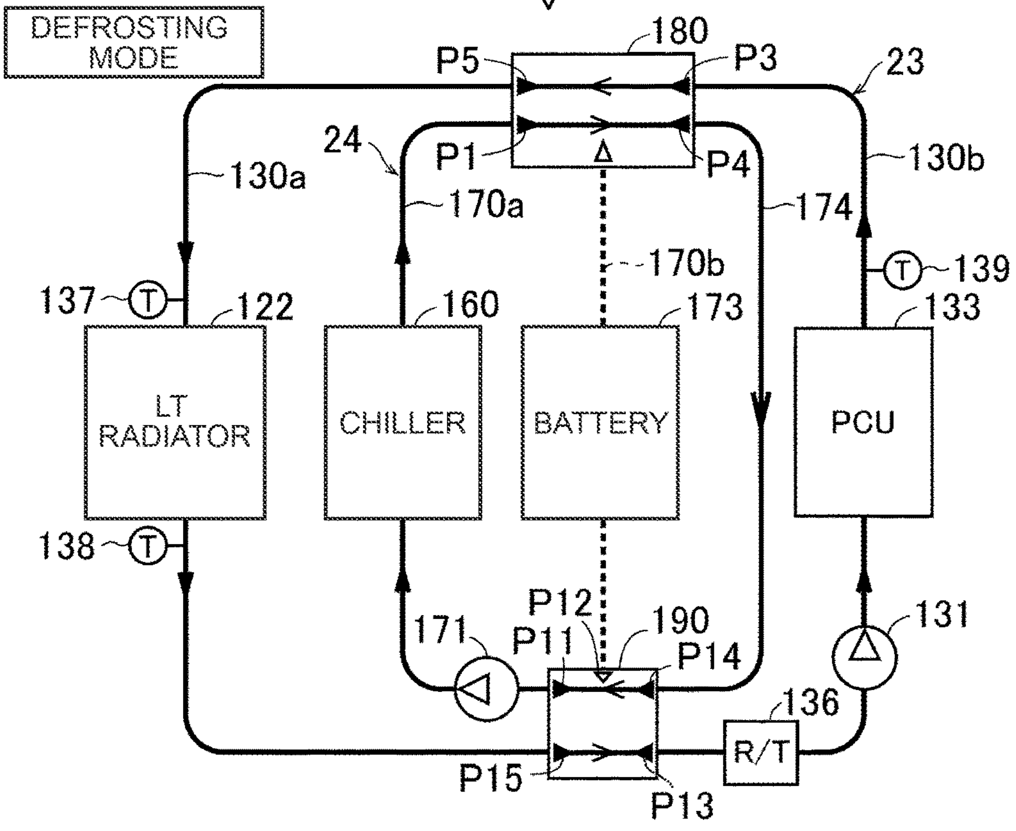
FIG. 6B is a diagram schematically showing an example of the defrosting mode of the thermal management circuit in the fourth embodiment of the present disclosure.

Next, a thermal management circuit in a fourth embodiment of the present disclosure will be described with reference to FIGS. 6A and 6B. FIG. 6A schematically shows an example of the heat storage mode of the thermal management circuit in the fourth embodiment of the present disclosure. FIG. 6B schematically shows an example of a defrosting mode of the thermal management circuit in the fourth embodiment of the present disclosure. Note that in the fourth embodiment, only the parts that are different from the first embodiment will be explained, and the same structure, operation, and effect as in the first embodiment will not be repeated.

The heat storage mode is a mode in which a closed circuit 21 in which the heat medium circulates through the flow path 130*b* and the bypass flow path 174 is formed, and a closed circuit 22 in which the heat medium circulates through the flow path 130*a* and the flow path 170*a* is formed. That is, in the heat storage mode, ports P1 and P5 of the five-way valve 180 are connected to each other, and ports P3 and P4 are connected to each other. Furthermore, in the heat storage mode, ports P11 and P15 of the five-way valve 190 are connected to each other, and ports P13 and P14 are connected to each other. In the heat storage mode, heat generated by the PCU 133 and the like is stored in the heat medium circulating in the closed circuit 21. Note that the closed circuit 21 may be a circuit in which the heat medium circulates through the flow path 170*b* and the flow path 130*b*.

The defrosting mode is a mode in which a circuit is formed in which the heat medium circulates at least through the flow path 130*b* and the flow path 130*a*. In the defrosting mode shown in FIG. 6B, a closed circuit 23 in which the heat medium circulates through the flow path 130*b* and the flow path 130*a* is formed, and a closed circuit 24 in which the heat medium circulates through the flow path 170*a* and the bypass flow path 174 is formed. It is formed. That is, ports P1 and P4 of the five-way valve 180 are connected to each other, and ports P3 and P5 are connected to each other. Furthermore, ports P11 and P14 of the five-way valve 190 are connected to each other, and ports P13 and P15 are connected to each other. In the defrosting mode, the heat accumulated in the heat medium circulating in the closed circuit 21 in the heat storage mode is supplied to the low temperature radiator 122. As a result, frost adhering to the low temperature radiator 122 is effectively removed.

In this embodiment, an upstream temperature sensor 137 is provided in a portion of the flow path 130*a* upstream of the low temperature radiator 122, and a downstream temperature sensor 138 is provided in a portion of the flow path 130*a* downstream of the low temperature radiator 122. It is provided. The upstream temperature sensor 137 detects the temperature of the heat medium flowing into the low temperature radiator 122. The downstream temperature sensor 138 detects the temperature of the heat medium flowing out from the low temperature radiator 122. Further, a temperature sensor 139 is provided in a portion of the flow path 130*b* on the downstream side of the PCU 133.

The ECU 500 controls each of the five-way valves 180 and 190 to enter the heat storage mode when the outside temperature is within a preset temperature range (for example, 0 degrees or more and 10 degrees or less). Further, the ECU 500 controls each of the five-way valves 180 and 190 so that the defrosting mode is entered when a frost adhesion condition indicating that frost has adhered to the low temperature radiator 122 is established. Note that if the frost adhesion condition is established when the outside temperature is within the above temperature range, the ECU 500 controls the five-way valves 180 and 190 to enter the defrosting mode.

The difference between the temperature of the heat medium flowing into the low-temperature radiator 122 (detected value by the upstream temperature sensor 137) and the temperature of the heat medium flowing out from the low-temperature radiator 122 (detected value by the downstream temperature sensor 138) has become less than the threshold value. At this time, the ECU 500 determines that the frost adhesion condition is satisfied.

When the frost adhesion condition is satisfied and the amount of heat possessed by the heat medium sent to the low-temperature radiator 122 is smaller than the amount of heat required to remove the frost attached to the low-temperature radiator 122, the ECU 500 controls the drive device. By reducing the operating efficiency of (PCU 133 and oil cooler 134), the amount of heat generated in the drive device is increased. Note that the amount of heat possessed by the heat medium sent to the low-temperature radiator 122 is determined by the temperature of the heat medium flowing in the downstream part of the PCU 133 in the flow path 130*b* (detected value of the temperature sensor 139), and the temperature of the heat medium flowing through the flow path 130*b* on the downstream side of the PCU 133. It is calculated based on the flow rate (rotational speed of water pump 131), etc.

Whether the amount of heat possessed by the heat medium sent to the low-temperature radiator 122 is smaller whether the amount of heat required to remove the frost attached to the low-temperature radiator 122 depends on, for example, the vehicle speed (wind speed hitting the low-temperature radiator 122) and the outside temperature, based on a map showing the relationship between the flow rate of the heat medium flowing into the low-temperature radiator 122 (rotational speed of the water pump 131, etc.) and the temperature of the heat medium flowing through a portion of the flow path 130*b* on the downstream side of the PCU 133. It will be judged.

Although illustration is omitted, in the defrosting mode, the flow path 170*b* is separated, and a closed circuit is formed in which the heat medium circulates through the flow path 130*b*, the bypass flow path 174, the flow path 170*a*, and the flow path 130*a* in this order. may be done. In this case, ports P1 and P5 of the five-way valve 180 are connected to each other, and ports P3 and P4 are connected to each other. Furthermore, ports P11 and P14 of the five-way valve 190 are connected to each other, and ports P13 and P15 are connected to each other.

Alternatively, in the defrosting mode, a closed circuit may be formed in which the flow path 170*b* is separated and the heat medium circulates through the flow path 130*b*, the flow path 130*a*, the flow path 170*a*, and the bypass flow path 174 in this order. In this case, ports P1 and P4 of the five-way valve 180 are connected to each other, and ports P3 and P5 are connected to each other. Furthermore, ports P11 and P15 of the five-way valve 190 are connected to each other, and ports P13 and P14 are connected to each other.

Fifth Embodiment

Figure 7A:
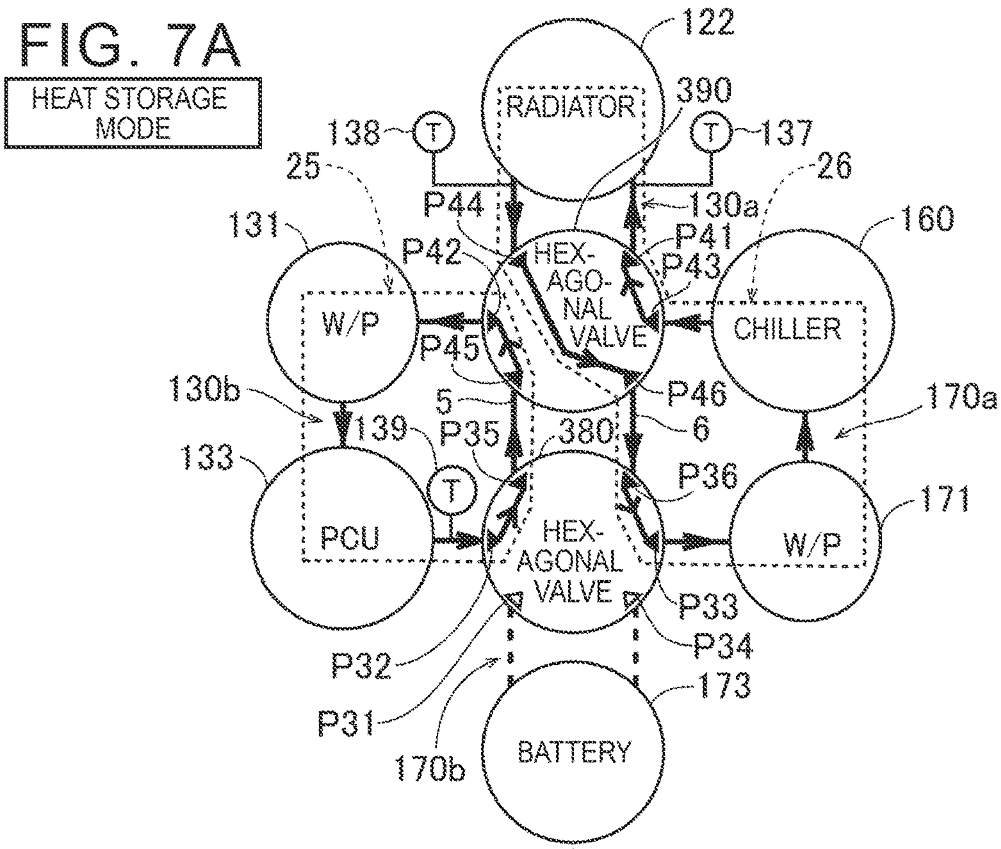
FIG. 7A is a diagram schematically illustrating an example of a heat storage mode of a thermal management circuit according to a fifth embodiment of the present disclosure.
Figure 7B:
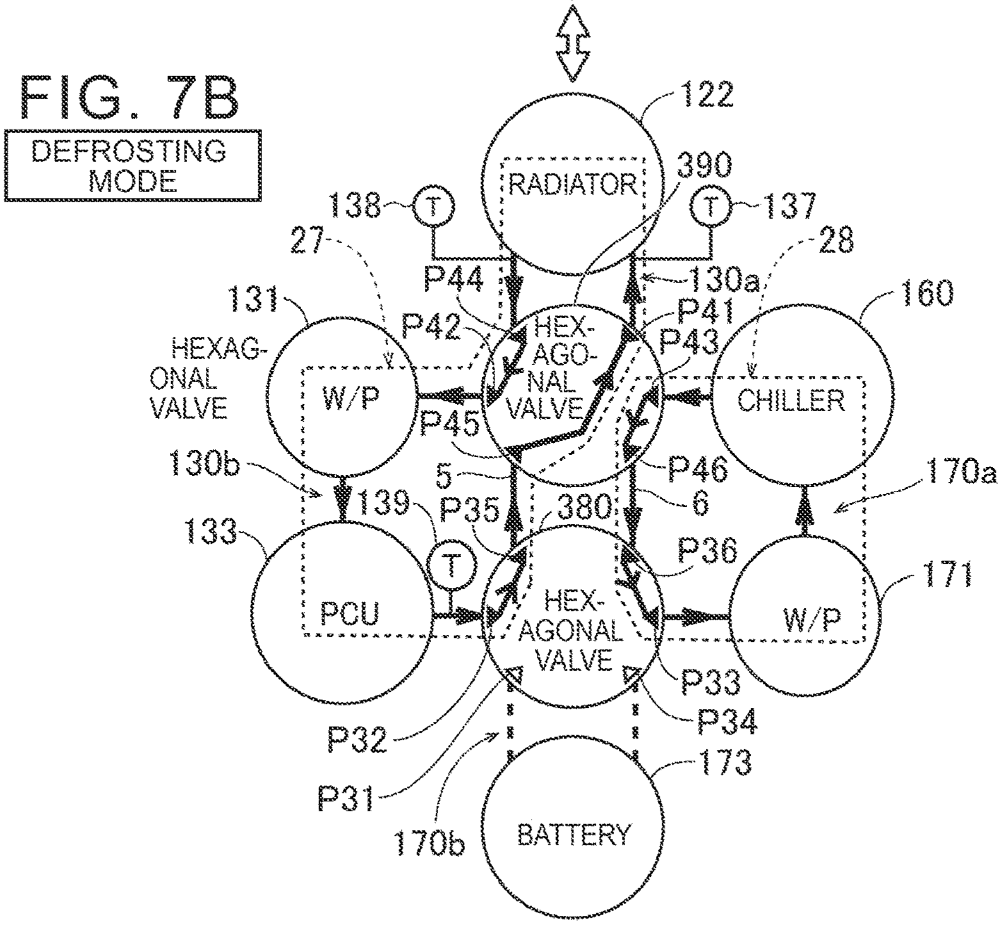
FIG. 7B is a diagram schematically showing an example of the defrosting mode of the thermal management circuit in the fifth embodiment of the present disclosure.

Next, a thermal management circuit in a fifth embodiment of the present disclosure will be described with reference to FIGS. 7A and 7B. FIG. 7A schematically shows an example of the heat storage mode of the thermal management circuit in the fifth embodiment of the present disclosure. FIG. 7B schematically shows an example of a defrosting mode of the thermal management circuit in the fifth embodiment of the present disclosure. Note that in the fifth embodiment, only the parts that are different from the fourth embodiment will be explained, and the same structure, operation, and effect as in the first embodiment will not be repeated.

The heat management circuit in this embodiment includes two hexagonal valves 380 and 390 as switching devices, similar to the third embodiment.

The heat storage mode is a mode in which a closed circuit 25 is formed in which the heat medium circulates through the flow path 130*b* and the connecting flow path 5, and a closed circuit 26 is formed in which the heat medium circulates through the flow path 130*a* and the flow path 170*a*. That is, in the heat storage mode, ports P32 and P35 of the six-way valve 380 are connected to each other, and ports P33 and P36 are connected to each other. Furthermore, ports P41 and P43 of the six-way valve 390 are connected to each other, ports P42 and P45 are connected to each other, and ports P44 and P46 are connected to each other. In the heat storage mode, heat generated by the PCU 133 and the like is stored in the heat medium circulating in the closed circuit 25. Note that the closed circuit 25 may be a circuit in which the heat medium circulates through the flow path 170*b* and the flow path 130*b*.

The defrosting mode is a mode in which a circuit is formed in which the heat medium circulates at least through the flow path 130*b* and the flow path 130*a*. In the defrosting mode shown in FIG. 7B, a closed circuit 27 in which the heat medium circulates through the flow path 130*b* and the flow path 130*a* is formed, and a closed circuit 28 in which the heat medium circulates through the flow path 170*a* and the connecting flow path 6 is formed. It is formed. That is, port P32 and port P35 of hexagonal valve 380 are connected to each other, and port P33 and port P36 are connected to each other. Furthermore, ports P41 and P45 of the six-way valve 390 are connected to each other, ports P42 and P44 are connected to each other, and ports P43 and P46 are connected to each other. In the defrosting mode, the heat accumulated in the heat medium circulating in the closed circuit 25 in the heat storage mode is supplied to the low temperature radiator 122. As a result, frost adhering to the low temperature radiator 122 is effectively removed.

Although not shown, in the defrosting mode, the flow path 170*b* may be separated and a closed circuit may be formed in which the heat medium circulates through the flow path 130*b*, the flow path 170*a*, and the flow path 130*a* in this order. In this case, ports P32 and P33 of the six-way valve 380 are connected to each other, ports P41 and P43 of the six-way valve 390 are connected to each other, and ports P42 and P44 are connected to each other.

It will be appreciated by those skilled in the art that the exemplary embodiments described above are specific examples of the following aspects.

Aspect 1

A thermal management system provided in an electric device, the thermal management system including:

a first flow path, a second flow path, a third flow path, and a fourth flow path each configured to allow a heat medium to flow through the flow path;

a power storage device configured to exchange heat with the heat medium flowing through the first flow path;

a drive device configured to exchange heat with the heat medium flowing through the second flow path and supply a driving force to the electric device;

a radiator provided in the third flow path;

a chiller provided in the fourth flow path; and a switching device configured to switch a connection state between the first flow path, the second flow path, the third flow path, and the fourth flow path, in which the switching device is configured to disconnect the first flow path from the other flow paths when a temperature of the power storage device is equal to or higher than a first set temperature and equal to or lower than a second set temperature that is higher than the first set temperature.

In this thermal management system, the first flow path is separated from the other flow paths when the temperature of the power storage device is higher than or equal to the first set temperature and lower than or equal to the second set temperature. Therefore, unnecessary heat inflow into the power storage device and unnecessary cooling of the power storage device are suppressed. Therefore, it becomes possible to appropriately manage the temperature of the power storage device. Note that the first set temperature and the second set temperature are set within a range in which the power storage device can fully demonstrate its capabilities.

Aspect 2

A thermal management system provided in an electric device, the thermal management system including:

a first flow path, a second flow path, a third flow path, and a fourth flow path each configured to allow a heat medium to flow through the flow path;

a power storage device configured to exchange heat with the heat medium flowing through the first flow path;

a drive device configured to exchange heat with the heat medium flowing through the second flow path and supply a driving force to the electric device;

a radiator provided in the third flow path;

a chiller provided in the fourth flow path; and a switching device configured to switch a connection state between the first flow path, the second flow path, the third flow path, and the fourth flow path, in which the switching device is configured to switch a heat storage mode and a defrosting mode, the heat storage mode is a mode in which a circuit where the heat medium circulates through the second flow path and the switching device or a circuit where the heat medium circulates through the first flow path and the second flow path is provided and a circuit where the heat medium circulates through the third flow path and the fourth flow path is provided, and the defrosting mode is a mode in which a circuit where the heat medium circulates at least through the second flow path and the third flow path is provided.

In this thermal management system, heat is stored in the heat medium flowing through the second flow path in the heat storage mode. Therefore, by switching from the heat storage mode to the defrosting mode, the heat possessed by the heat medium is supplied to the radiator provided in the third flow path. Therefore, frost adhering to the radiator is effectively removed.

Aspect 3

The thermal management system according to aspect 2, in which the switching device is configured to provide a circuit of the heat storage mode when an outside air temperature is within a preset temperature range, and provide a circuit of the defrosting mode when a frost adhesion condition indicating that frost adheres to the radiator is satisfied.

Aspect 4

The thermal management system according to aspect 3, in which the drive device is configured to reduce an operation efficiency of the drive device to increase an amount of heat generated in the drive device when the frost adhesion condition is satisfied and an amount of heat of the heat medium sent to the radiator is smaller than an amount of heat required to remove the frost adhering to the radiator.

The embodiments disclosed herein should be considered as illustrative and not restrictive in all respects. The scope of the present disclosure is shown by the claims rather than the above embodiments, and also includes all modifications within the meaning and the scope equivalent to those of the claims.

What is claimed is:

1. A thermal management system provided in a vehicle, the thermal management system comprising:
- a first flow path, a second flow path, a third flow path, a fourth flow path, and a fifth flow path, each configured to allow a heat medium to flow through;
- a power storage device configured to exchange heat with the heat medium flowing through the first flow path;
- a drive device configured to exchange heat with the heat medium flowing through the second flow path and to supply a driving force to the vehicle;
- a radiator provided in the third flow path;
- a chiller provided in the fourth flow path; and
- a switching device configured to switch a connection state between the first flow path, the second flow path, the third flow path, the fourth flow path, and the fifth flow path, the switching device including a first five-way valve and a second five-way valve, and the fifth flow path connecting the first five-way valve and the second five-way valve to each other and bypassing the power storage device, wherein
- the first five-way valve includes
  - a first port into which the heat medium having passed through the chiller flows, the first port being connected to the fourth flow path,
  - a second port from which the heat medium flows out toward the power storage device, the second port being connected to the first flow path,
  - a third port into which the heat medium having passed through the drive device flows, the third port being connected to the second flow path,
  - a fourth port from which the heat medium flows out toward the fifth flow path, the fourth port being connected to the fifth flow path, and
  - a fifth port from which the heat medium flows out toward the radiator, the fifth port being connected to the third flow path, and
- the first five-way valve is configured to establish a connection state where the first port and the fifth port are in communication with each other and the third port and the fourth port are in communication with each other, thereby disconnecting the first flow path from the second flow path, the third flow path, the fourth flow path, and the fifth flow path in a case where a temperature of the power storage device is equal to or higher than a first set temperature and equal to or lower than a second set temperature that is higher than the first set temperature.

2. The thermal management system according to claim 1, wherein
- the second five-way valve includes
  - a sixth port from which the heat medium flows out toward the chiller, the sixth port being connected to the fourth flow path,
  - a seventh port into which the heat medium having passed through the power storage device flows, the seventh port being connected to the first flow path,
  - an eighth port from which the heat medium flows out toward the drive device, the eighth port being connected to the second flow path,
  - a ninth port into which the heat medium from the fifth flow path flows, the ninth port being connected to the fifth flow path, and
  - a tenth port into which the heat medium from the radiator flows, the tenth port being connected to the third flow path, and
- the second five-way valve is configured to establish a connection state where the sixth port and the ninth port are in communication with each other and the eighth port and the tenth port are in communication with each other, thereby disconnecting the first flow path from the second flow path, the third flow path, the fourth flow path, and the fifth flow path in the case where the temperature of the power storage device is equal to or higher than the first set temperature and equal to or lower than the second set temperature.

3. The thermal management system according to claim 1, further comprising a heater provided in the first flow path and configured to heat the heat medium, wherein
- the fifth flow path extends so as to bypass the heater and the power storage device.

4. The thermal management system according to claim 1, wherein the first set temperature and the second set temperature are updated based on an outside air temperature outside the vehicle using machine learning.

5. The thermal management system according to claim 1, further comprising a temperature sensor configured to detect a temperature of the power storage device, wherein
- the first five-way valve is configured to establish the connection state where the first port and the fifth port are in communication with each other and the third port and the fourth port are in communication with each other in response to determining that a detected value of the temperature sensor is equal to or higher than the first set temperature and equal to or lower than the second set temperature.

6. The thermal management system according to claim 2, further comprising a temperature sensor configured to detect a temperature of the power storage device, wherein
- the first five-way valve is configured to establish the connection state where the first port and the fifth port are in communication with each other and the third port and the fourth port are in communication with each other in response to determining that a detected value of the temperature sensor is equal to or higher than the first set temperature and equal to or lower than the second set temperature.

7. The thermal management system according to claim 6, wherein the second five-way valve is configured to establish the connection state where the sixth port and the ninth port are in communication with each other and the eighth port and the tenth port are in communication with each other in response to determining that the detected value of the temperature sensor is equal to or higher than the first set temperature and equal to or lower than the second set temperature.

8. The thermal management system according to claim 1, wherein the second port of the first five-way valve is not in communication with the first port, the third port, the fourth port, and the fifth port during the connection state in which the first port and the fifth port are in communication with each other and the third port and the fourth port are in communication with each other.

* * * * *